(12) United States Patent
Chen et al.

(10) Patent No.: US 9,762,113 B2
(45) Date of Patent: Sep. 12, 2017

(54) CONTROL CIRCUIT, CONTROL METHOD AND FLYBACK CONVERTER

(71) Applicant: Silergy Semiconductor Technology (Hangzhou) LTD, Hangzhou, ZheJiang Province (CN)

(72) Inventors: Huiqiang Chen, Hangzhou (CN); Jianxin Wang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 15/086,420

(22) Filed: Mar. 31, 2016

(65) Prior Publication Data

US 2016/0301407 A1    Oct. 13, 2016

(30) Foreign Application Priority Data

Apr. 24, 2015 (CN) .......................... 2015 1 0200350

(51) Int. Cl.

| H02M 7/48 | (2007.01) |
|---|---|
| H02M 1/08 | (2006.01) |
| H02M 1/36 | (2007.01) |
| H02M 3/335 | (2006.01) |
| H02M 1/42 | (2007.01) |
| H02M 1/00 | (2006.01) |

(52) U.S. Cl.
CPC ............ *H02M 1/08* (2013.01); *H02M 1/36* (2013.01); *H02M 3/33507* (2013.01); *H02M 1/4208* (2013.01); *H02M 2001/0025* (2013.01); *Y02B 70/126* (2013.01); *Y02P 80/112* (2015.11)

(58) Field of Classification Search
CPC ............ H02M 3/335; H02M 3/33569; H02M 3/33507; H02M 3/33515; H02M 3/315; H02M 3/28
USPC ..... 363/20, 21.01, 21.12, 21.13, 95, 98, 131
See application file for complete search history.

(56) References Cited

U.S. PATENT DOCUMENTS

| 9,054,592 B2 | 6/2015 | Yao et al. | |
|---|---|---|---|
| 9,246,394 B2 | 1/2016 | Deng | |
| 2007/0216372 A1* | 9/2007 | Weng | H02M 3/156 323/222 |
| 2008/0238396 A1* | 10/2008 | Ng | H03F 3/217 323/284 |
| 2010/0039836 A1* | 2/2010 | Gong | H02M 3/156 363/21.13 |
| 2010/0066169 A1* | 3/2010 | Apfel | H02M 3/156 307/31 |

(Continued)

*Primary Examiner* — Adolf Berhane
(74) *Attorney, Agent, or Firm* — Michael C. Stephens, Jr.

(57) ABSTRACT

In one embodiment, a control circuit can include: a voltage feedback circuit configured to obtain a voltage feedback signal that represents an output voltage of the power stage circuit; a set signal generator configured to output a set signal when a secondary current crosses zero or a voltage sampling signal reaches a valley value; a reset signal generator configured to output a reset signal in a constant on time mode when the voltage feedback signal is greater than a first voltage threshold value, and to output the reset signal in a peak current mode when the voltage feedback signal is less than the first voltage threshold value; and a logic circuit configured to activate a switching control signal according to the set signal, and to deactivate the switching control signal according to the reset signal.

7 Claims, 7 Drawing Sheets

(56) References Cited

U.S. PATENT DOCUMENTS

| | | | |
|---|---|---|---|
| 2011/0241641 A1* | 10/2011 | Chen | H02M 3/1588 |
| | | | 323/284 |
| 2013/0051089 A1* | 2/2013 | Pan | H02M 1/44 |
| | | | 363/21.17 |
| 2013/0301309 A1 | 11/2013 | Chen | |
| 2013/0314065 A1* | 11/2013 | Jian | G05F 1/46 |
| | | | 323/284 |
| 2015/0022163 A1 | 1/2015 | Han et al. | |
| 2015/0069958 A1* | 3/2015 | Yang | H02J 7/0052 |
| | | | 320/107 |
| 2015/0381032 A1* | 12/2015 | Li | H02M 1/36 |
| | | | 323/271 |
| 2016/0336808 A1* | 11/2016 | Liu | H02M 7/219 |

\* cited by examiner

CONTROL CIRCUIT, CONTROL METHOD AND FLYBACK CONVERTER

RELATED APPLICATIONS

This application claims the benefit of Chinese Patent Application No. 201510200350.7, filed on Apr. 24, 2015, which is incorporated herein by reference in its entirety.

FIELD OF THE INVENTION

The present disclosure generally relates to the field of power electronics, and more particularly to control circuits and methods for a flyback converter.

BACKGROUND

For a switch-type converter, a constant on time control mode can be adopted in order to achieve a higher power factor. This is because a proportion factor of an input current and an input voltage is in direct proportion to a ratio of a square value of an on time and a switching period. Thus, once the on time is fixed, the input current may follow the input voltage when the switching period changes slightly in a full power frequency cycle, so as to obtain a relatively high power factor correction (PFC). Therefore, constant on time controlled converter are widely used in many power factor regulating applications.

SUMMARY

In one embodiment, a control circuit configured to control a power stage circuit of a flyback converter, can include: (i) a voltage feedback circuit configured to obtain a voltage feedback signal that represents an output voltage of the power stage circuit; (ii) a set signal generator configured to output a set signal when a secondary current crosses zero or a voltage sampling signal reaches a valley value; (iii) a reset signal generator configured to output a reset signal in a constant on time mode when the voltage feedback signal is greater than a first voltage threshold value, and to output the reset signal in a peak current mode when the voltage feedback signal is less than the first voltage threshold value; and (iv) a logic circuit configured to activate a switching control signal according to the set signal, and to deactivate the switching control signal according to the reset signal, where the switching control signal is configured to control a power switch of the power stage circuit.

In one embodiment, a method of controlling a power stage circuit, can include: (i) obtaining a voltage feedback signal representing an output voltage of a power stage circuit; (ii) controlling a power switch of the power stage circuit in a constant on time mode when the voltage feedback signal is greater than a first voltage threshold value; and (iii) controlling the power switch in a peak current mode when the voltage feedback signal is less than the first voltage threshold value.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

If a switch-type converter adopts a constant on time mode to start, or to switch a load when outputting a constant voltage, the on time may be the same, regardless of the value of the input voltage. Because the energy required for starting a converter or switching the input voltage of a converter differs under different input voltages, the starting speed or switching speed may be relatively slow.

In one embodiment, a control circuit configured to control a power stage circuit of a flyback converter, can include: (i) a voltage feedback circuit configured to obtain a voltage feedback signal that represents an output voltage of the power stage circuit; (ii) a set signal generator configured to output a set signal when a secondary current crosses zero or a voltage sampling signal reaches a valley value; (iii) a reset signal generator configured to output a reset signal in a constant on time mode when the voltage feedback signal is greater than a first voltage threshold value, and to output the reset signal in a peak current mode when the voltage feedback signal is less than the first voltage threshold value; and (iv) a logic circuit configured to activate a switching control signal according to the set signal, and to deactivate the switching control signal according to the reset signal, where the switching control signal is configured to control a power switch of the power stage circuit.

Figure 1:
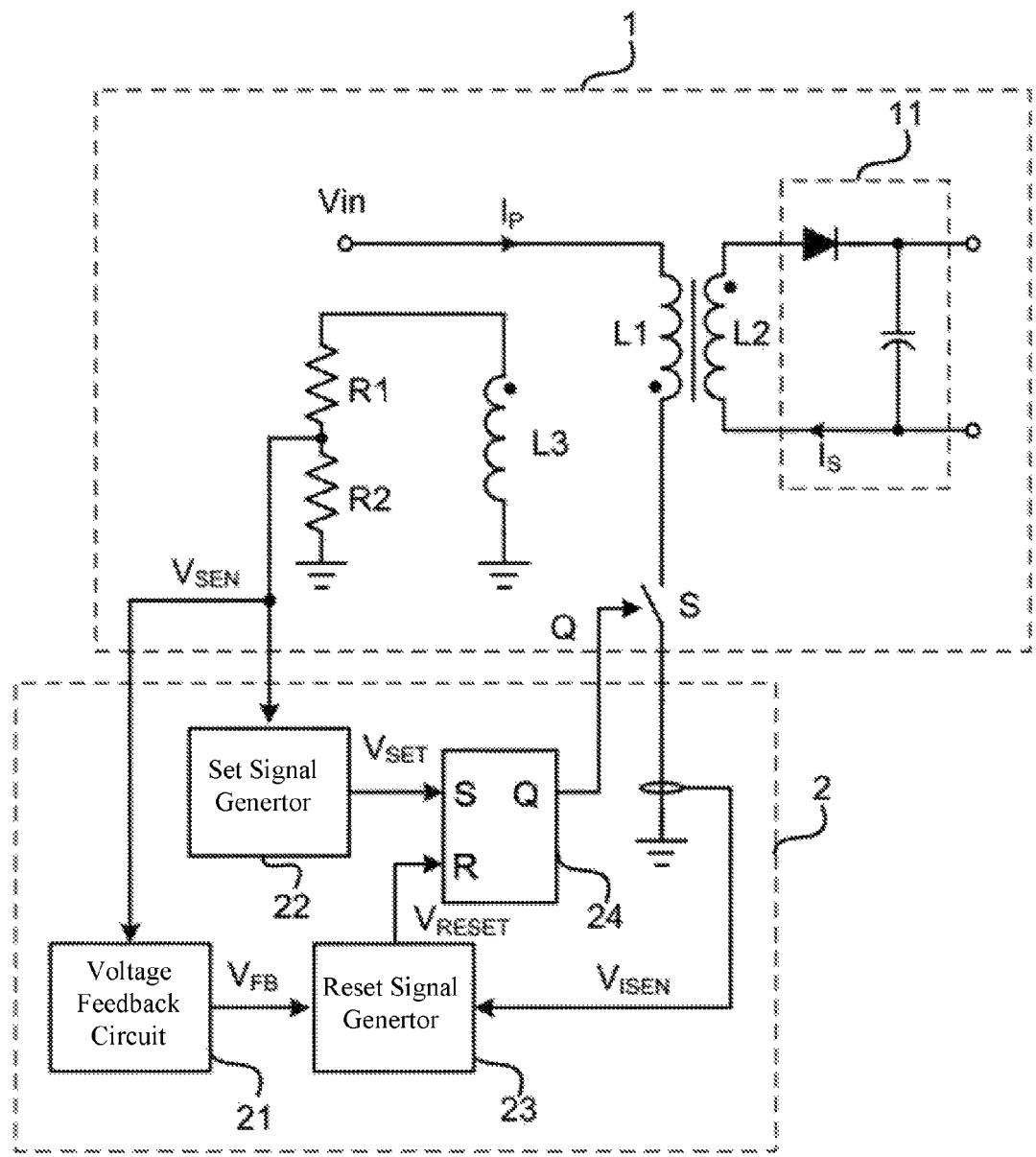
FIG. 1 is a schematic block diagram of an example flyback converter, in accordance with embodiments of the present invention.

Referring now to FIG. 1, shown is a schematic block diagram of an example flyback converter, in accordance with embodiments of the present invention. In this particular example, the flyback converter can include power stage circuit 1 and control circuit 2. For example, power stage circuit 1 may be of a flyback topology, and can include primary winding L1 and power switch S connected in series between voltage input terminal Vin and ground. Secondary winding L2 can connect with primary winding L1, and secondary rectifier circuit 11 can connect with secondary winding L2.

Power stage circuit 1 may also include auxiliary winding L3 and resistors R1 and R2 for dividing a voltage across auxiliary winding L3. Auxiliary winding L3 can be coupled with primary winding L1. Thus, information about an output voltage of power stage circuit 1, a current zero-crossing moment of secondary winding L2, and a current valley time may be obtained via the voltage across auxiliary winding L3. As such, the above mentioned information can be obtained by sampling the voltage across the auxiliary winding, so as to control power switch S based on the obtained information. Also, while a flyback converter is exemplified herein with primary feedback, other converter topologies and feedback schemes can also be supported in certain embodiments.

Control circuit 2 can generate switching control signal Q according to a feedback parameter of power stage circuit 1, in order to turn on/off power switch S. For example, control circuit 2 can include voltage feedback circuit 21, set signal generator 22, reset signal generator 23, and logic circuit 24. Voltage feedback circuit 21 can obtain voltage feedback signal $V_{FB}$. Voltage feedback signal $V_{FB}$ can be in proportion to the output voltage (VO) for representing output voltage VO of power stage circuit 1.

In this example, a zero-crossing moment of secondary current Is can be detected by sampling the voltage across auxiliary winding L3, and may obtain voltage feedback signal $V_{FB}$ at the zero-crossing moment. Set signal generator 22 can generate set signal $V_{SET}$ when the secondary current crosses zero or the voltage feedback signal reaches a valley value. The zero-crossing moment of a secondary current can be detected by sampling the voltage across auxiliary winding L3, and the moment when the voltage sampling signal reaches the valley value can also be detected. Set signal generator 22 can generate set signal $V_{SET}$ at such moments to set switching control signal Q through logic circuit 24, such that switching control signal Q can be activated. For example, set signal $V_{SET}$ may be a voltage pulse or a rising edge or a falling edge of a voltage.

Reset signal generator 23 can generate reset signal $V_{RESET}$ in different modes according to voltage feedback signal $V_{FB}$. When voltage feedback signal $V_{FB}$ is greater than voltage threshold value V1, reset signal generator 23 can generate reset signal $V_{RESET}$ in a constant on time mode (e.g., reset signal $V_{RESET}$ is activated when power switch S is turned on for a constant on time). When voltage feedback signal $V_{FB}$ is less than voltage threshold value V1, reset signal generator 23 can generate reset signal $V_{RESET}$ in a peak current mode (e.g., reset signal $V_{RESET}$ is activated when the primary current reaches a predetermined threshold value after power switch S is turned on). For example, reset signal $V_{RESET}$ may be a voltage pulse or a falling edge or a rising edge of a voltage.

Logic circuit 24 can activate switching control signal Q according to set signal $V_{SET}$, and switching control signal Q may be deactivated according to reset signal $V_{RESET}$. In this particular example, an active switching control signal Q can be such that switching control signal Q is at a level for turning on power switch S, and an inactive switching control signal Q can be when switching control signal Q is at a level for turning off power switch S. In this particular example, logic circuit 24 is implemented by an RS flip-flop.

More energy is input to the flyback converter in every switching period under a peak current mode, so the output voltage may rapidly rise. The output voltage of the flyback converter may quickly reach a predetermined value by controlling the power switch under the peak current mode in cases of start-up or the input voltage switching from high to low. Then, the power switch can be controlled under the constant on time mode after the output voltage reaches the predetermined value, so as to fast start-up the flyback converter, or fast switch the input voltage.

Figure 2:
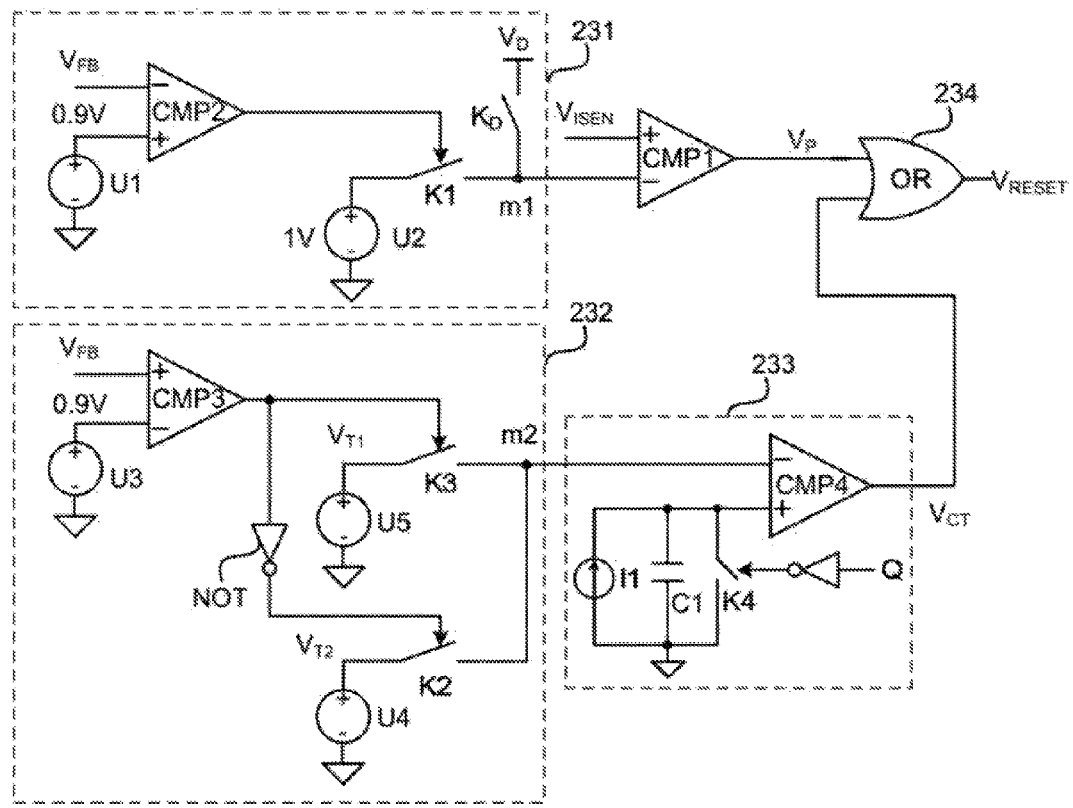
FIG. 2 is a schematic block diagram of an example reset signal generator, in accordance with embodiments of the present invention.

Referring now to FIG. 2, shown is a schematic block diagram of an example reset signal generator, in accordance with embodiments of the present invention. In this particular example, reset signal generator 23 can include current threshold value generator 231, comparator CMP1, time threshold value generator 232, timing circuit 233, and logic circuit 234. Current threshold value generator 231 can generate a current threshold value (e.g., the current threshold value is 1V) in cases when voltage feedback signal $V_{FB}$ is less than voltage threshold value V1. Delayed current threshold value $V_D$ can be generated in cases when voltage feedback signal $V_{FB}$ is greater than voltage threshold value V1. Delayed current threshold value VD may be relatively large such that the peak indication signal transitions after reaching the constant on time, or never transitions in a whole switching period.

For example, current threshold value generator 231 can include comparator CMP2, voltage sources U1 and U2, switches K1 and $K_D$. Voltage source U1 can connect between a non-inverting input terminal of comparator CMP2 and ground, and may generate voltage threshold value V1 (e.g., 0.9V). An inverting input terminal of comparator CMP2 can receive input voltage feedback signal $V_{FB}$. An output terminal of comparator CMP2 can connect to a control terminal of switch K1. Switch K1 can connect between voltage source U2 and output terminal m1 of the current threshold value.

Comparator CMP2 may generate a high level when voltage feedback signal $V_{FB}$ is less than a voltage threshold value (e.g., 0.9V), for turning on switch K1, so that the current threshold value generator 231 may output current threshold value VTH (e.g., 1V). Comparator CMP2 can output a low level when output feedback signal $V_{FB}$ is greater than a voltage threshold value (e.g., 0.9V), for turning off switch K1, so that current threshold value generator 231 may not output current threshold value VTH. So, the voltage at output terminal m1 may be set as delayed current threshold value $V_D$ by turning on switch $K_D$. Switch $K_D$ can be controlled by an inverse signal of a control signal of switch K1.

Comparator CMP1 can compare primary current sampling signal $V_{ISEN}$ against current threshold value VTH or $V_D$), and may generate peak indication signal $V_P$. Primary current sampling signal $V_{ISEN}$ can be obtained by sampling a current flowing through the power switch through a sampling circuit that is synchronous with primary current IP of power stage circuit 1. Primary current sampling signal $V_{ISEN}$ may continue to rise after power switch S is turned on. Peak indication signal $V_P$ can transition from low to high when primary current sampling signal $V_{ISEN}$ reaches current threshold value VTH, in order to indicate that the primary current has reached the predetermined peak value. Switching control signal Q can be inactive based on peak indication signal $V_P$ under the peak current mode, so as to turn off power switch S when primary current IP reaches the predetermined peak value.

Time threshold value generator 232 can output a constant on time threshold value $V_{T1}$ when voltage feedback signal $V_{FB}$ is greater than voltage threshold value V1, and may output delayed time threshold value $V_{T2}$ when voltage feedback signal $V_{FB}$ is less than voltage threshold value V1. Constant on time threshold value $V_{T1}$ is less than delayed time threshold value $V_{T2}$. For example, time threshold value generator 232 can include comparator CMP3, voltage sources U3-U5, switches K2 and K3, and inverter NOT. Voltage source U3 can connect between an inverting input terminal of comparator CMP3 and ground, and may output voltage threshold value V1 (e.g., 0.9V). A non-inverting input terminal of comparator CMP3 can receive voltage feedback signal $V_{FB}$. An output terminal of comparator CMP3 can connect to an input terminal of inverter NOT and a control terminal of switch K3.

An output terminal of inverter NOT can connect to a control terminal of switch K2, and switch K2 can connect between voltage source U4 and time threshold value output terminal m2. Switch K3 can connect between voltage source U5 and time threshold value output terminal m2. Comparator CMP3 can output a low level when voltage feedback signal $V_{FB}$ is less than a voltage threshold value (e.g., 0.9V), for turning on switch K2 and turning off switch K3, such that time threshold value generator 232 may output delayed time threshold value $V_{T2}$ with a relatively large value. Delayed time threshold value $V_{T2}$ may cause timing circuit 233 to set the timing signal as a high level, or keep the timing signal unchanged in the full switching period only when peak indication signal $V_P$ indicates that primary current IP reaches the peak value.

Comparator CMP3 can output a high level when voltage feedback signal $V_{FB}$ is greater than a voltage threshold value (e.g., 0.9V), for turning off switch K2 and turning on switch K3, such that time threshold value generator 231 may output constant on time threshold value $V_{T1}$ with a relatively small value. In such a case, current threshold value generator 231 can output the delayed current threshold value with a relatively large value. Thus, peak indication signal $V_P$ may remain low, and constant on time threshold value $V_{T1}$ can control timing circuit 233 to output timing signal $V_{CT}$, so as to control power switch S to be turned off in constant on time mode. Timing circuit 233 can generate timing signal $V_{CT}$ according to time threshold value $V_{T1}$ or $V_{T2}$. Timing signal $V_{CT}$ may be used to indicate that switching control signal Q has been active for a time corresponding to time threshold value $V_{T1}$ or $V_{T2}$.

Timing circuit 233 can include comparator CMP4, current source I1, charge capacitor C1, and switch K4. Current source IL charge capacitor C1 and switch K4 can connect in parallel between a non-inverting input terminal of comparator CMP4 and the ground. An inverting input terminal of comparator CMP4 can receive time threshold value $V_{T1}$ or $V_{T2}$. Switch K4 can be controlled by an inverse signal of switching control signal Q. That is, switch K4 can be turned off when power switch S is on, and turned on when power switch S is off. When switch K4 is off, current source I1 can charge capacitor C1, so a voltage at the non-inverting input terminal may rise in a predetermined slope. When switch K4 is on, charge capacitor C1 can be shorted to result in the voltage at the non-inverting input terminal going to be zero in a very short time. Thus, after power switch S is turned on, the voltage at the non-inverting input terminal may rise to reach the time threshold value after constant on time TON corresponding to the time threshold value, such that timing signal $V_{CT}$ from comparator CMP4 may transition to represent that switching control signal Q has been kept active for constant on time TON.

Reset logic circuit 234 can output reset signal $V_{RESET}$ according to timing signal $V_{CT}$ and peak indication signal $V_P$. In this particular example, reset logic circuit 234 is an OR-gate. Reset logic circuit 234 can output reset signal $V_{RESET}$ with a high level when either timing signal $V_{CT}$ or peak indication signal $V_P$ goes high, so as to reset switching control signal Q or set switching control signal Q to be low. Thus, peak indication signal $V_P$ may remain low when voltage feedback signal $V_{FB}$ is greater than voltage threshold value V1, or can transition after the timing signal transitions. Reset signal $V_{RESET}$ can change along with timing signal $V_{CT}$, and may control power switch S in the constant on time mode. Timing signal $V_{CT}$ may transition to a high level in the last moment, or never go high, when voltage feedback signal $V_{FB}$ is less than voltage threshold value V1. Reset signal $V_{RESET}$ can change along with peak indication signal $V_P$, in order to control power switch S in the peak current mode.

Reset signal generator 23 may use at least two different current threshold values to generate a reset signal in the voltage peak mode, in order to control power switch S based on at least two current threshold values. At least two different current threshold values may change when voltage feedback signal $V_{FB}$ is in different sessions or time portions of a given switching cycle. That is, the current threshold values can be a piecewise function of voltage feedback signal $V_{FB}$. For example, reset signal generator 23 can output reset signal $V_{RESET}$ according to current threshold value VTH1 in a first session in which voltage feedback signal $V_{FB}$ is less than voltage threshold value V1 and greater than voltage threshold value V2, and may output reset signal $V_{RESET}$ according to the second current threshold value in a second session in which voltage feedback signal $V_{FB}$ is less than voltage threshold value V2.

Figure 3:
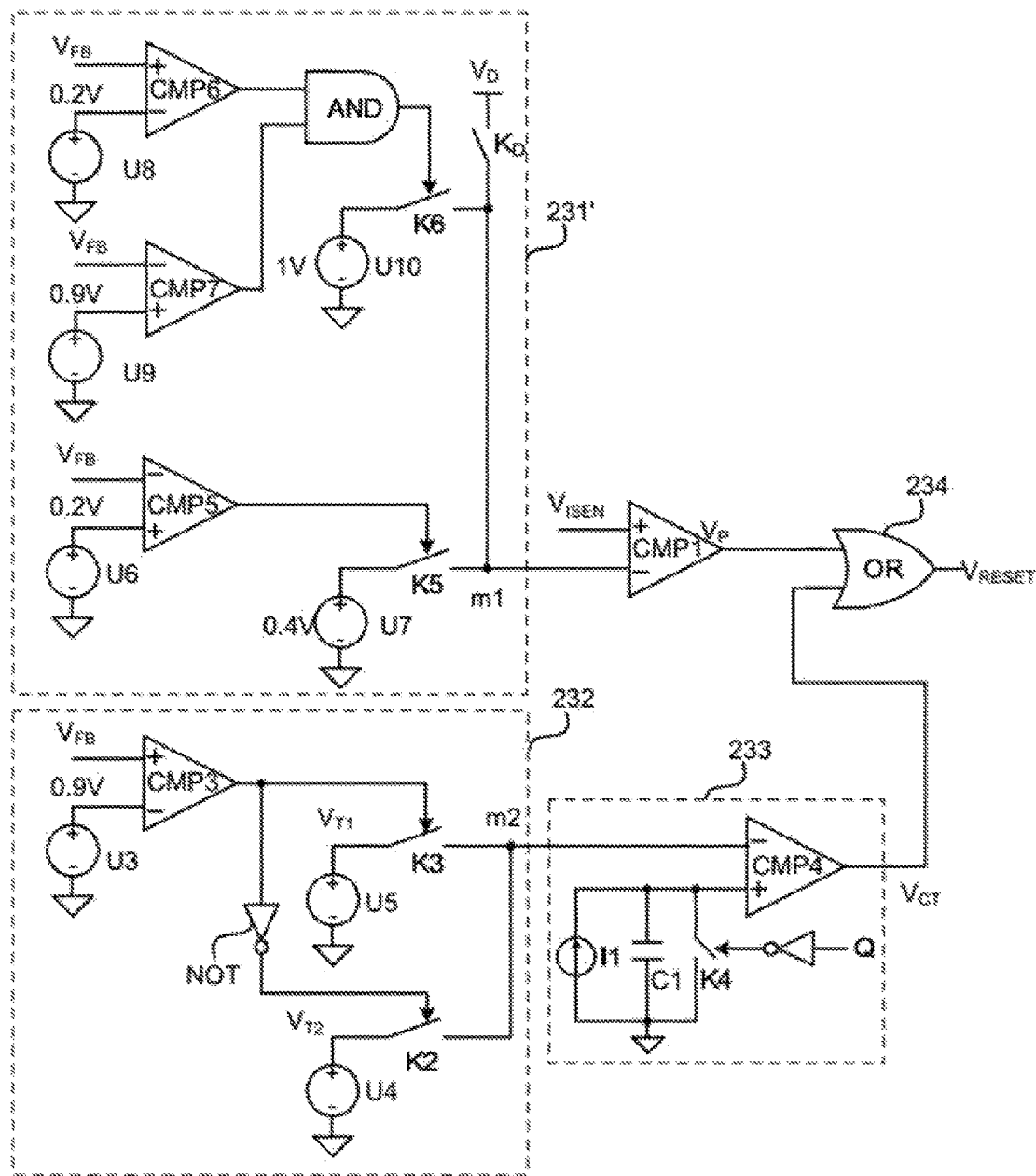
FIG. 3 is a schematic block diagram of an example set signal generator, in accordance with embodiments of the present invention.
Figure 4:
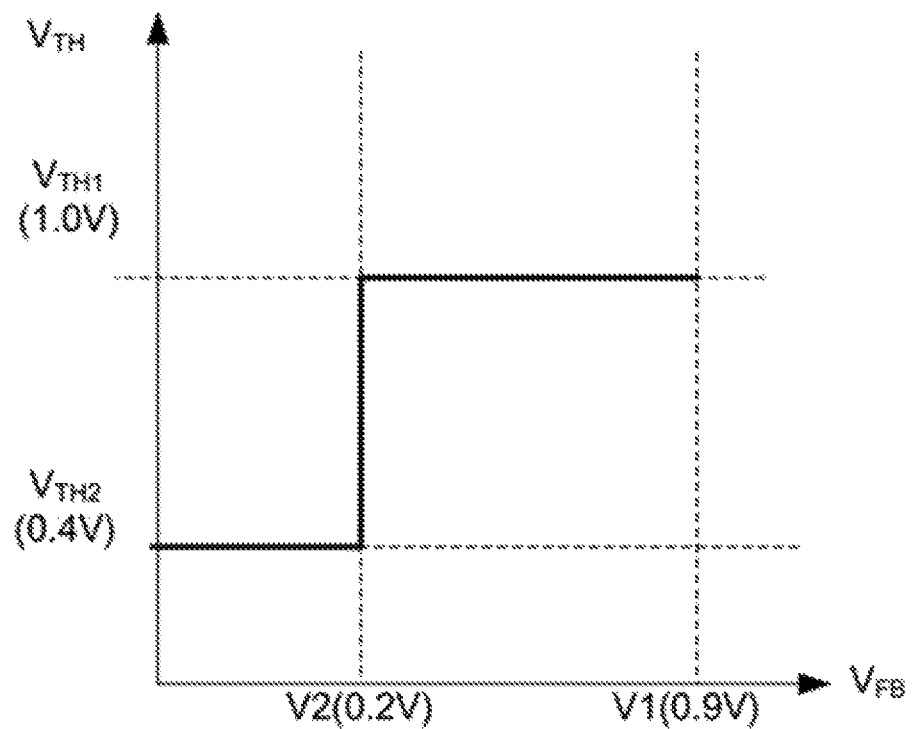
FIG. 4 is a waveform diagram of an example current threshold value that changes along with a voltage feedback signal in the circuit of FIG. 3, in accordance with embodiments of the present invention.

Referring now to FIG. 3, shown is a schematic block diagram of an example set signal generator, in accordance with embodiments of the present invention. Referring also to FIG. 4, shown is a waveform diagram of an example current threshold value that changes along with a voltage feedback signal in the circuit of FIG. 3. As shown in FIG. 4, current threshold value VTH2 is lower when voltage feedback signal $V_{FB}$ is less than V2 in the second session, and current threshold value VTH1 is higher when voltage feedback signal $V_{FB}$ is greater than V1 but less than V1 in the first session. For example, when the circuit is initially started up, a relatively low $V_{ISEN}$ can be set as a reference to prevent the power stage circuit from entering the continuous conduction mode (CCM) due to the poor demagnetization capability when the output voltage is not established, in order to solve potential problems of weak voltage stress of the diode and the power switch. More energy can be transferred to the power stage circuit in every switching cycle under the control of current threshold value VTH1 with a relatively high value when the output voltage is large enough to demagnetize the inductor, such that the output voltage may quickly reach the predetermined value. In this way, the operating stability of a circuit that is quickly started up can be improved in certain embodiments.

Reset signal generator 23 can include current threshold value generator 231', comparator CMP1, time threshold value generator 232, timing circuit 233, and logic circuit 234. Current threshold value generator 231 can output current threshold value VTH1 when voltage feedback signal $V_{FB}$ is less than voltage threshold value V1 and greater than voltage threshold value V2 (e.g., 0.2V), can output current threshold value VTH2 when the voltage feedback signal is less than voltage threshold value V2, and may output the delayed current threshold value when the voltage feedback signal $V_{FB}$ is greater than voltage threshold value V1 (e.g., 0.9V).

Current threshold value generator 231' can include comparator CMP5, voltage sources U6 and U7, and switch K5. Voltage source U6 can connect between a non-inverting input terminal of comparator CMP5 and ground, and may output voltage threshold value V2 (e.g., 0.2V). An inverting input terminal of comparator CMP5 can receive voltage feedback signal $V_{FB}$. An output terminal of comparator CMP5 can connect to a control terminal of switch K5. Switch K5 can connect between voltage source U7 and output terminal m1 of the current threshold value. Comparator CMP5 can output a high level when voltage feedback signal $V_{FB}$ is less than the second voltage threshold value (e.g., 0.2V), for turning on switch K5, such that current threshold value generator 231' may output current threshold value VTH2 (e.g., 0.4V). Comparator CMP5 can output a low level when output feedback signal $V_{FB}$ is greater than the second voltage threshold value, for turning off switch K5, such that voltage source U7 is effectively disconnected from output terminal m1 of the current threshold value.

Current threshold value generator 231' can also include comparator CMP6, CMP7, voltage sources U8-U10, switch K6, and an AND-gate. Voltage source U8 can connect between the inverting input terminal of comparator CMP6 and ground, and a voltage input to the inverting input terminal can equal voltage threshold value V2. A non-inverting input terminal of comparator CMP6 can receive voltage feedback signal $V_{FB}$. Also, voltage source U9 can connect between the non-inverting input terminal of comparator CMP7 and ground, and a voltage input to the non-inverting input terminal can equal voltage threshold value V1. An inverting input terminal of comparator CMP7 can receive voltage feedback signal $V_{FB}$.

The output terminals of comparators CMP7 and CMP6 can connect to an input terminal of the AND-gate. The AND-gate can output a high level when voltage feedback signal $V_{FB}$ is less than voltage threshold value V1 and greater than voltage threshold value V2. The output terminal of the AND-gate can connect with the control terminal of switch K6, so as to control switch K6 to be turned on when the AND-gate outputs a high level. One terminal of switch K6 can connect with voltage source U10, and the other terminal can connect with output terminal m1. Output terminal m1 can receive current threshold value VTH1 (e.g., 1V) from voltage source U10 when switch K6 is on.

Switches K5 and K6 may both be off when voltage feedback signal $V_{FB}$ is greater than voltage threshold value V1, so the voltage at output terminal m1 can be set as a relatively large voltage value (e.g., delayed current threshold value $V_D$) via switch $K_D$. Switch $K_D$ can be controlled by the NAND signal generated according to the control signal of switches K5 and K6. Thus, the current threshold value generator 231' can generate two different current threshold values according to voltage feedback signal $V_{FB}$, in order to improve the operating stability of the circuit when the circuit is rapidly started up.

Figure 5:
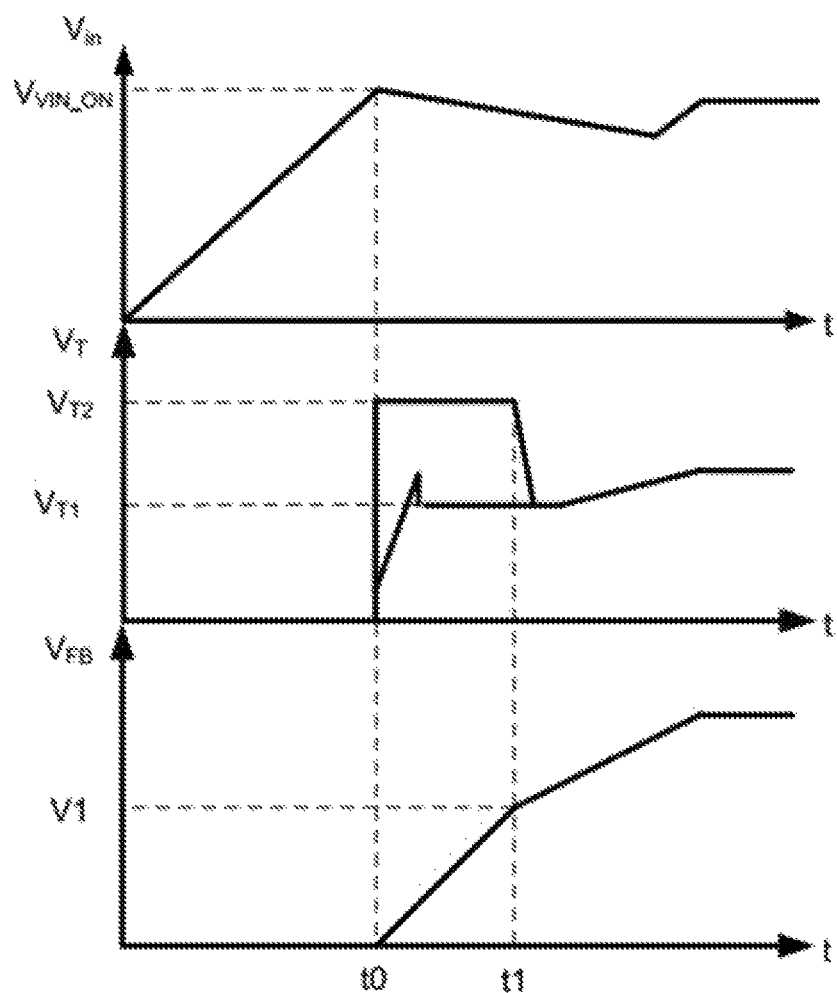
FIG. 5 is a waveform diagram of an example start-up state of a flyback converter, in accordance with embodiments of the present invention.

Referring now to FIG. 5, shown is a waveform diagram of an example start-up state of a flyback converter, in accordance with embodiments of the present invention. In this particular example, when the flyback converter is started up, the input voltage may gradually rise, and the control circuit can be started up when the input voltage is greater than initial threshold value $V_{VIN\_ON}$ at time t0, and voltage feedback signal $V_{FB}$ begins rising with the output voltage. Since the output voltage may not be established when voltage feedback signal $V_{FB}$ is lower than voltage threshold value V1, the control circuit can clamp the time threshold signal as delayed time threshold value $V_{T2}$. When voltage feedback signal $V_{FB}$ is greater than voltage threshold value V1 at time t1, the output voltage may be established, and the control circuit can set the time threshold signal as constant on time threshold value $V_{T1}$, and may control power switch S in the constant on time mode. Therefore, the circuit may be started up relatively quickly. It should be noted that constant on time threshold value $V_{T1}$ is shown as a curved line because constant on time threshold value $V_{T1}$ can be regulated during a longer time period relative to a switching period in some applications.

Figure 6:
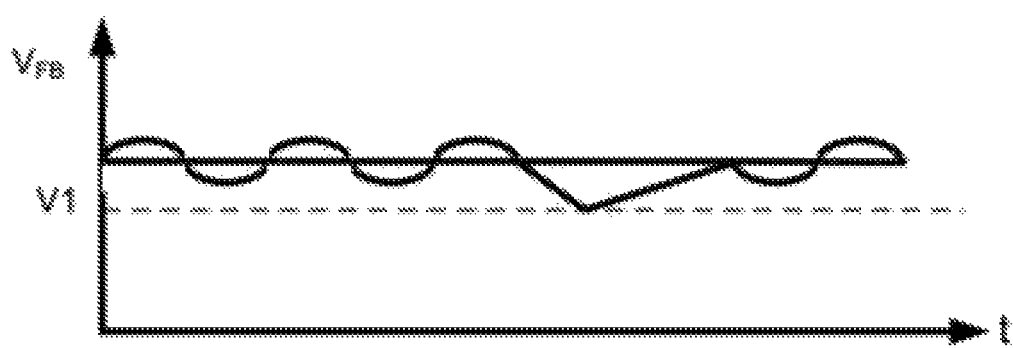
FIG. 6 is a waveform diagram of example operation when input voltage of a flyback converter switching from high to low, in accordance with embodiments of the present invention.

Referring now to FIG. 6, shown is a waveform diagram of example operation when input voltage of a flyback converter switching from high to low, in accordance with embodiments of the present invention. In this particular example, the output voltage may suddenly fall down when the input voltage switches to low from high. Thus, an enable circuit can be added such that the control circuit can control the power stage circuit when voltage feedback signal $V_{FB}$ is less than the first voltage threshold value, and the output voltage may recover to the normal value in the peak current mode, in order to reduce the negative effects on the system.

In one embodiment, a method of controlling a power stage circuit, can include: (i) obtaining a voltage feedback signal representing an output voltage of a power stage circuit; (ii) controlling a power switch of the power stage circuit in a constant on time mode when the voltage feedback signal is greater than a first voltage threshold value; and (iii) controlling the power switch in a peak current mode when the voltage feedback signal is less than the first voltage threshold value.

Figure 7:
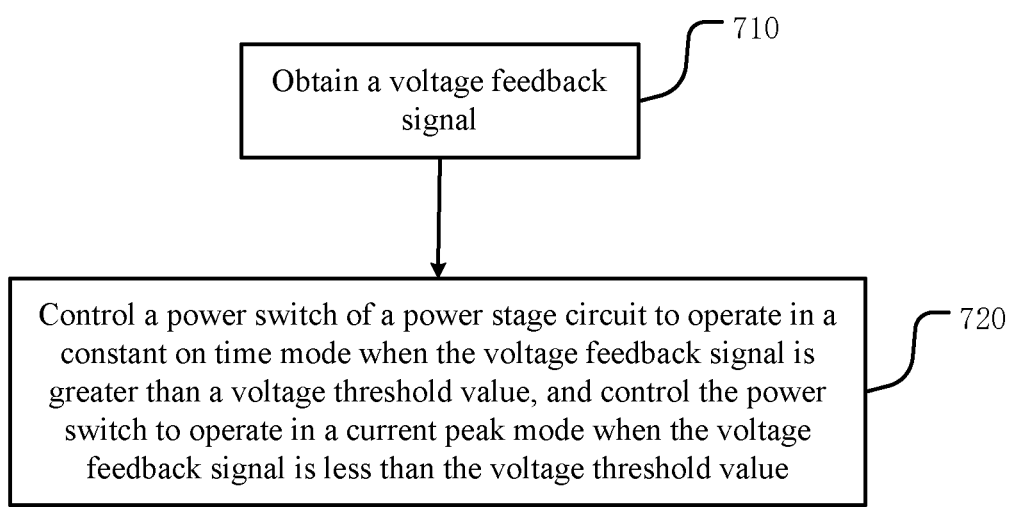
FIG. 7 is a flow diagram of an example method of controlling a flyback converter, in accordance with embodiments of the present invention.

Referring now to FIG. 7, shown is a flow diagram of an example method of controlling a flyback converter, in accordance with embodiments of the present invention. In 710, a voltage feedback signal can be obtained to represent an output voltage of a power stage circuit. In 720, a power switch of the power stage circuit can be controlled in a constant on time mode when the voltage feedback signal is greater than the first voltage threshold value, and the power switch of the power stage circuit can be controlled in a peak current mode when the voltage feedback signal is less than the first voltage threshold value. The output voltage of the flyback converter may rapidly reach a predetermined value by controlling the power switch in the peak current mode in case of start-up or when the input voltage switches from high to low. Then, the power switch can be controlled in the constant on time mode after the output voltage reaches the predetermined value, in order to fast start up the flyback converter or fast switch the input voltage.

For example, the controlling of the power switch of the power stage circuit in the peak current mode when the voltage feedback signal is less than the first voltage threshold value can include controlling the power switch according to at least two different current threshold values when the voltage feedback signal is less than the first voltage threshold value, where the current threshold value is a piecewise function of the voltage feedback signal. In this way operating stability of a circuit that is fast started up can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit configured to control a power stage circuit of a flyback converter, the control circuit comprising:
   a) a voltage feedback circuit configured to obtain a voltage feedback signal that represents an output voltage of said power stage circuit;
   b) a set signal generator configured to output a set signal when a secondary current crosses zero or a voltage sampling signal reaches a valley value;
   c) a reset signal generator configured to output a reset signal in a constant on time mode when said voltage feedback signal is greater than a first voltage threshold value, and to output said reset signal in a peak current mode according to at least two different current threshold values when said voltage feedback signal is less than said first voltage threshold value, wherein at least one of said current threshold values is a piecewise function of said voltage feedback signal; and
   d) a logic circuit configured to activate a switching control signal according to said set signal, and to deactivate said switching control signal according to said reset signal, wherein said switching control signal is configured to control a power switch of said power stage circuit.

2. The control circuit of claim 1, wherein said reset signal generator comprises:
   a) a current threshold value generator configured to output a first current threshold value when said voltage feedback signal is less than said first voltage threshold value, and to output a delayed current threshold value when said voltage feedback signal is greater than said first voltage threshold value, wherein said first current threshold value is less than said delayed current threshold value;
   b) a comparator configured to compare a primary current sampling signal against a current threshold value, and to output a peak indication signal;
   c) a time threshold value generator configured to output a constant on time threshold value when said voltage feedback signal is greater than said first voltage threshold value, and to output a delayed time threshold value when said voltage feedback signal is less than said first voltage threshold value, wherein said constant on time threshold value is less than said delayed time threshold value;
   d) a timing circuit configured to generate a timing signal according to a time threshold value for representing that said switching control signal has been active for a time corresponding to said time threshold value; and
   e) a reset logic circuit configured to generate said reset signal according to said timing signal and said peak indication signal.

3. The control circuit of claim 1, wherein said reset signal generator is configured to output said reset signal when said voltage feedback signal is less than said first voltage threshold value and greater than a second voltage threshold value, and to output said reset signal when said voltage feedback signal is less than said second voltage threshold value.

4. The control circuit of claim 3, wherein said reset signal generator comprises:
   a) a current threshold value generator configured to output said first current threshold value when said voltage feedback signal is less than said first voltage threshold value and greater than said second voltage threshold value, to output said second current threshold value when said voltage feedback signal is less than said second voltage threshold value, and to output said delayed current threshold value when said voltage feedback signal is greater than said first voltage threshold value, wherein said delayed current threshold value is greater than said first and second current threshold values;
   b) a comparator configured to compare a primary current sampling signal against a current threshold value, and to output a peak indication signal;
   c) a time threshold value generator configured to output a constant on time threshold value when said voltage feedback signal is greater than said first voltage threshold value, and to output a delayed time threshold value when said voltage feedback signal is less than said first voltage threshold value, wherein said constant on time threshold value is less than said delayed time threshold value;
   d) a timing circuit configured to generate a timing signal according to a time threshold value representing that said switching control signal has been active for a time corresponding to said time threshold value; and
   e) a reset logic circuit configured to generate said reset signal according to said timing signal and said peak indication signal.

5. The control circuit of claim 1, wherein said control circuit is configured to control said power stage circuit in a start-up state of said power stage circuit or when an input voltage of said power stage circuit switches from high to low.

6. A method of controlling a power stage circuit, the method comprising:
   a) obtaining a voltage feedback signal representing an output voltage of a power stage circuit;
   b) controlling a power switch of said power stage circuit in a constant on time mode when said voltage feedback signal is greater than a first voltage threshold value; and
   c) controlling said power switch in a peak current mode according to at least two different current threshold values when said voltage feedback signal is less than said first voltage threshold value, wherein at least one of said current threshold values is a piecewise function of said voltage feedback signal.

7. A method of controlling a power stage circuit, the method comprising:
   a) obtaining a voltage feedback signal representing an output voltage of a power stage circuit;
   b) controlling a power switch of said power stage circuit in a constant on time mode when said voltage feedback signal is greater than a first voltage threshold value; and
   c) controlling said power switch in a peak current mode when said voltage feedback signal is less than said first voltage threshold value, wherein said control method is configured to control said power stage circuit in a start-up state of said power stage circuit or when an input voltage of said power stage circuit switches from high to low.

* * * * *